United States Patent
Zhao et al.

(10) Patent No.: US 12,428,519 B2
(45) Date of Patent: Sep. 30, 2025

(54) SILICATE MODIFIED POLYMER FOAM MATERIAL FOR FILLING AND SEALING

(71) Applicants: WELEAD Infrastructure Engineering Technology (Zhengzhou), Ltd., Henan (CN); SAFEKEY Engineering Technology (Zhengzhou), Ltd., Henan (CN)

(72) Inventors: Peng Zhao, Henan (CN); Hongyuan Fang, Henan (CN); Lei Wang, Henan (CN); Chengchao Guo, Henan (CN); Mingrui Du, Henan (CN); Chao Zhang, Henan (CN); Guobin Qiao, Henan (CN)

(73) Assignee: SAFEKEY Engineering Technology (Zhengzhou), Ltd., Henan (CN)

( * ) Notice: Subject to any disclaimer, the term of this patent is extended or adjusted under 35 U.S.C. 154(b) by 314 days.

(21) Appl. No.: 17/945,440

(22) Filed: Sep. 15, 2022

(65) Prior Publication Data
US 2023/0043883 A1     Feb. 9, 2023

(30) Foreign Application Priority Data
Jan. 28, 2022   (CN) .......................... 202210108735.0

(51) Int. Cl.
| | | |
|---|---|---|
| C08G 18/76 | (2006.01) | |
| C08G 18/38 | (2006.01) | |
| C08G 18/83 | (2006.01) | |
| C08J 9/12  | (2006.01) | |

(52) U.S. Cl.
CPC ....... C08G 18/7614 (2013.01); C08G 18/388 (2013.01); C08G 18/837 (2013.01); C08J 9/125 (2013.01); *C08J 2203/10* (2013.01); *C08J 2375/04* (2013.01)

(58) Field of Classification Search
CPC .. C08G 18/10; C08G 18/3878; C08G 18/388; C08G 18/3895; C08G 18/7614; C08G 18/7621; C08G 18/8054; C08G 18/837; C08G 2101/00; C08G 2110/0083; C08J 9/125; C08J 2203/10; C08J 2375/04
See application file for complete search history.

(56) References Cited

FOREIGN PATENT DOCUMENTS

| | | | | |
|---|---|---|---|---|
| CN | 102050836 A | * | 5/2011 | |
| CN | 103694672 A | * | 4/2014 | |
| CN | 104277203 A | * | 1/2015 | ............. C08G 18/48 |
| KR | 10-0906715 B1 | * | 7/2009 | |

OTHER PUBLICATIONS

Translation of CN102050836 (Year: 2011).*
Translation of CN103694672 (Year: 2014).*
Translation of CN104277203 (Year: 2015).*
Translation of KR100906715 (Year: 2009).*

* cited by examiner

*Primary Examiner* — John M Cooney

(57) ABSTRACT

A silicate modified polymer foam material for filling and sealing contains prepolymerized isocyanate and a silicate modified aqueous solution with a mass ratio in a range of 1:(1.2-1.4). In the prepolymerized isocyanate, a mass percentage of P is 4.4%, a mass percentage of N is 7.9%, and a mass percentage of —NCO is 11.9%. The silicate modified aqueous solution includes liquid sodium silicate, small molecule alcohol, water and a catalyst, wherein the liquid sodium silicate, the small molecule alcohol, the water and the catalyst account for 63-66%, 17-20%, 14-17% and 1.5-2.5% of the weight of the silicate modified aqueous solution respectively. A method of preparing the silicate modified polymer foam material for filling and sealing includes mixing the prepolymerized isocyanate with the silicate modified aqueous solution.

2 Claims, No Drawings

SILICATE MODIFIED POLYMER FOAM MATERIAL FOR FILLING AND SEALING

CROSS REFERENCE OF RELATED APPLICATION

The present invention claims priority under 35 U.S.C. 119(a-d) to CN 202210108735.0, filed Jan. 28, 2022.

BACKGROUND OF THE PRESENT INVENTION

Field of Invention

The present invention relates to a silicate modified polymer foam material for filling and sealing, which belongs the field of silicate modified material technology.

Description of Related Arts

Grouting engineering is widely used in mines, tunnels and other underground projects to strengthen and prevent seepage and plugging, improve the mechanical strength and deformation modulus of rock and soil (coal) layers, and strengthen the integrity of rock and soil (coal) layers; or to cut off permeable water flow, reduce the permeability of rock and soil (coal) layers and improve the impermeability of the formation. At the same time, it is also widely used in roads, building foundations and other projects to fill voids, remove accumulated water and compact soil, thereby improving the structural bearing capacity and repairing structural defects. For underground grouting engineering, grouting materials and grouting theory are two important research contents in the field of grouting engineering. The organic grouting material is an important research direction in recent years. Compared with particle slurries such as cement, cement-water glass, and cement-fly ash, it has the advantages of high sand-fixing strength, fast curing, good toughness, good durability, low slurry viscosity, good pourability and permeability.

There are two types of organic foam for filling and sealing: polyurethane foam and organic foam. Polyurethane foam has the advantages as follows. (1) It has low viscosity and is able to penetrate into small cracks well. (2) It has excellent adhesion ability to form a strong bond with the formation. (3) It has good flexibility to withstand subsequent formation movement. (4) Its foaming time is able to be adjusted, as fast as a few seconds, and as slow as a few minutes. (5) Its foaming ratio is able to be adjusted, such as 5-10 times and 20-50 times, which is able to be adjusted according to customer requirements. (6) It has high flash point and flame retardant, does not produce harmful gases, and is incompatible with water. (7) Once the polyurethane foam is solidified after foaming, the broken matrix is quickly reinforced and is not embrittled when compressed by 20-30%. However, The internal heat release of polyurethane foam is relatively large. If the grouting amount is too large at one time and the on-site control is not appropriate, there may be spontaneous combustion of the core. Moreover, due to the need for flame retardant, the addition of halogen flame retardants leads to relatively large combustion smoke. Therefore, polyurethane foam has now been eliminated from the industry.

For coal mines, the currently used organic foam for filling and sealing is phenolic foam, which has a high oxygen index greater or equal to 35%, and a small internal heat release during curing, which greatly reduces the phenomenon of spontaneous combustion. In addition to poor foam strength and brittleness, there are two fatal shortcomings. (1) Although its oxygen index is high, its combustion elongation is serious. The combustion elongation is actually the smoldering of phenolic foam, which has serious hazards. Once smoldering, the phenolic foam is able to continue until the material is completely exhausted ("Talking About Smoldering Fire", Fire Technology, 1992(04), Gao Jintian). Therefore, the AQ/T1090-2020 standard specifically stipulates the combustion elongation test method for the smoldering of phenolic foam. However, the combustion elongation is determined by the essence of phenolic foam, it is almost impossible to be solved. (2) Phenolic foam is high in formaldehyde content, and it is difficult to meet the relevant regulations on the limit of harmful substances in polymer foam materials in other adhesive parts in the solvent-based part of GB18583 (≤0.50 g/kg).

SUMMARY OF THE PRESENT INVENTION

An object of the present invention is to provide a silicate modified polymer foam material for filling and sealing, so as to solve the above-mentioned deficiencies in the prior art. The silicate modified polymer foam material uses prepolymerized isocyanate modified silicate, which combines inorganic grouting materials with polymer grouting materials. Compared with the current phenolic foam for coal mine filling and sealing, the silicate modified polymer foam material provided by the present invention solves two bottlenecks that the phenolic foam is difficult to pass the combustion elongation test and the formaldehyde content is high. The silicate modified polymer foam material provided by the present invention has the oxygen index ≥35%, expansion ratio ≥25, maximum reaction temperature ≤95° C., odor rating (80° C.)≤3.5, fog test ≤5 mg (no diffusion of physical additive flame retardants into the environment), smoke toxicity index ≤5; and particularly, it does not contain halogen flame retardants, has a small amount of smoke, does not release corrosive or irritating hydrogen halide gas, does not produce toxic carcinogens such as polybrominated benzoxoxins and polybrominated dibenzofurans, and does not increase the halogen content in coal.

Accordingly, the present invention provides a silicate modified polymer foam material for filling and sealing, which contains prepolymerized isocyanate and a silicate modified aqueous solution with a mass ratio in a range of 1:(1.2-1.4), wherein in the prepolymerized isocyanate, a mass percentage of P is 4.4%, a mass percentage of N is 7.9%, a mass percentage of —NCO is 11.9%, a structural formula of the prepolymerized isocyanate is

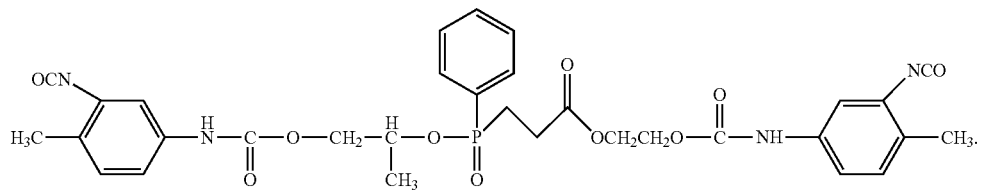

Preferably, the silicate modified aqueous solution comprises liquid sodium silicate, small molecule alcohol, water and a catalyst, wherein the liquid sodium silicate accounts for 63-66% of a weight of the silicate modified aqueous solution, the small molecule alcohol accounts for 17-20% of the weight of the silicate modified aqueous solution, the water accounts for 14-17% of the weight of the silicate modified aqueous solution, and the catalyst accounts for 1.5-2.5% of the weight of the silicate modified aqueous solution.

Preferably, the small molecule alcohol is highly active and highly polar polyether which takes ethylene glycol as a reagent and is polymerized and end-capped with ethylene oxide, and has a molecular weight in a range of 400 to 600.

Preferably, the small molecule alcohol is polyethylene glycol 400 or polyethylene glycol 600 produced by Jiangsu Haian Petrochemical Plant, China;

the liquid sodium silicate is 2451 of Qingdao Gulf Chemical Co., Ltd., China;

the catalyst is a tertiary amine catalyst, and is preferably DABCO-T produced by Evonik Specialty Chemicals (Shanghai) Co., Ltd., China), or ZF-10 (Huntsman).

Also, the present invention provides a method of preparing the prepolymerized isocyanate, which comprises steps of:

(A) preparing 2-carboxyethylphenyl ethylene glycol hypophosphite by performing an esterification reaction on 2-carboxyethylphenyl hypophosphorous acid and ethylene glycol with a molar ratio of 1:1, wherein a reaction equation of the esterification reaction is

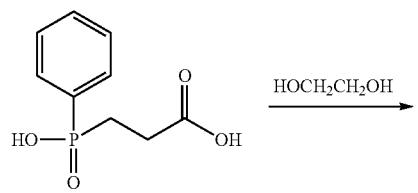

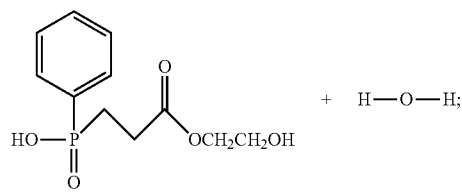

(B) obtaining a phosphorus-containing diol intermediate by performing an addition reaction on the 2-carboxyethylphenyl ethylene glycol hypophosphite and propylene oxide with a molar ratio of 1:1, wherein a reaction equation of the addition reaction is

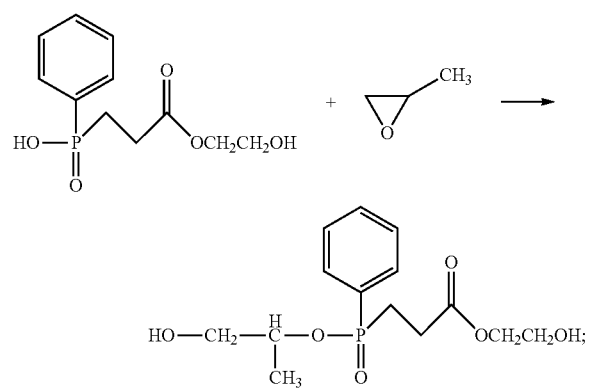

and (C) obtaining a difunctional modified flame retardant isocyanate compound, namely, the prepolymerized isocyanate, by performing a polymerization reaction on the phosphorus-containing diol intermediate and TDI, wherein a reaction equation of the polymerization reaction is

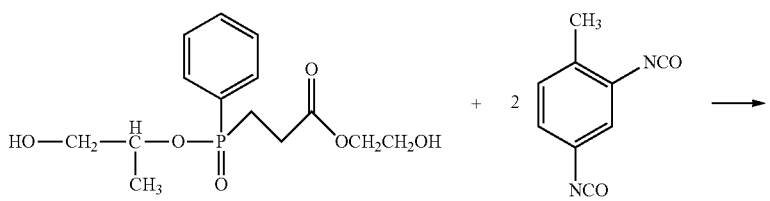

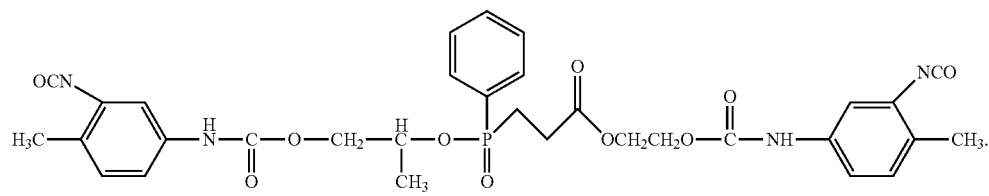

Specifically, a method of preparing a silicate modified polymer foam material for filling and sealing comprises steps of:
(a) putting 2-carboxyethylphenyl hypophosphorous acid which is produced by Wuhan Hezhong Biochemical Manufacturing Co., Ltd., China and ethylene glycol with a molar ratio of 1:1 into a reactor, performing an esterification reaction at 105-110° C. under catalysis of sulfuric acid or organotin, and obtaining 2-carboxyethylphenyl ethylene glycol hypophosphite after distilling water produced by the esterification reaction from a top of the reactor;
(b) heating the 2-carboxyethylphenyl ethylene glycol hypophosphite to 100-110° C. in the reactor, slowly adding propylene oxide into the reactor under a premise of using potassium hydroxide as a catalyst, wherein a molar ratio of the 2-carboxyethylphenyl ethylene glycol hypophosphite to the propylene oxide is 1:1, gradually increasing a pressure in the reactor, wherein a maximum pressure in the reactor is 2.5 kgf/cm$^2$, keeping a temperature in the reactor at 100-115° C., keeping the pressure for 4 h after completing the addition of propylene oxide, keeping the temperature in the reactor at 100° C., and obtaining a phosphorus-containing diol intermediate after removing unreacted small molecules in vacuum;
(c) heating another reactor to 48-52° C., firstly adding TDI into the another reactor, and then adding the phosphorus-containing diol intermediate into the another reactor at a constant rate, wherein a molar ratio of the phosphorus-containing diol intermediate to the TDI is in a range of 1:(3-4);
(d) heating the reactor to 78-82° C. and reacting for 1.9-2.2 h;
(e) removing unreacted TDI with a thin film evaporator;
(f) obtaining prepolymerized isocyanate after cooling the reactor to 48-52° C., wherein in the prepolymerized isocyanate, a mass percentage of P is 4.4%, a mass percentage of N is 7.9% and a mass percentage of —NCO is 11.9%; and
(g) mixing the prepolymerized isocyanate with a silicate modified aqueous solution according to a mass ratio in a range of 1:(1.2-1.4), thereby obtaining the silicate modified polymer foam material for filling and sealing.

The present invention has some beneficial effects as follows.

(1) The present invention solves the problem that the phenolic foam has a high oxygen index, but has serious combustion elongation. The combustion elongation is actually the smoldering of the phenolic foam. Once the phenolic foam is smoldering, it is able to continue until the material is completely exhausted. The prepolymerized isocyanate modified silicate material provided by the present invention is a silicate modified polymer foam material for filling and sealing, which combines the advantages of inorganic grouting materials and polymer grouting materials, wherein about 60% by weight of the raw materials is the silicate modified aqueous solution, and about 40% are structural flame retardant isocyanate. Based on the mass percentage, the main component of the silicate modified polymer foam material is an inorganic component, and no phenolic foam exists, so there is no unique smoldering problem that phenolic foam is difficult to extinguish, and especially about 40% of the raw materials are structural flame retardant isocyanate cooperating with a phosphorus content of 60% of the silicate modified aqueous solution, the oxygen index ≥35%, and no combustion exists at room temperature.

(2) The present invention solves the problem of high formaldehyde content in the phenolic foam. About 60% by weight of the silicate modified polymer foam material for filling and sealing is the silicate modified aqueous solution, and about 40% is the structural flame retardant isocyanate. Based on the mass percentage, the main component of the silicate modified polymer foam material is an inorganic component, and no phenolic foam exists, so there is no formaldehyde problem specific to phenolic foam. Compared with the current phenolic foam for coal mine filling and sealing, the silicate modified polymer foam material provided by the present invention has the oxygen index ≥35%, expansion ratio ≥25, maximum reaction temperature ≤95° C., smoke toxicity index ≤5; and particularly, it solves two bottlenecks of the phenolic foam.

(3) The silicate modified polymer foam material provided by the present invention is free of organic plasticizers, flame retardants and halogen, so the odor rating (80° C.)≤3.5, fog test ≤5 mg (no diffusion of physical additive flame retardants into the environment), and particularly, it does not contain halogen flame retardants, has a small amount of smoke, does not release corrosive or irritating hydrogen halide gas, does not produce toxic carcinogens such as polybrominated benzoxoxins and polybrominated dibenzofurans, and does not increase the halogen content in coal. However, in order to achieve an oxygen index of ≥35% for phenolic foam, various halogenated phosphorus-based physical flame retardants must also be added.

Compared with the conventionally used polymeric MDI or modified polymeric MDI, the —NCO group of TDI is less active due to steric hindrance. Two ends of the prepolymerized isocyanate of the present invention are capped with TDI, and at the same time, prepolymerized isocyanate is large in molecular weight, so that its reactivity is relatively moderate, avoiding the problem that the temperature of the system rises sharply caused by the violent heat discharge; and moreover, due to the increase in the amount of water and the large expansion of the volume, the temperature of the system is able to be kept ≤95° C., and the appropriate reactivity improves the adhesion.

In the present invention, a long chain segment is branched in the prepolymerized isocyanate, which greatly increases the toughness of the material.

Since the main raw material is the silicate modified aqueous solution, the surface has a good affinity with water, naturally has a small surface resistance, and has antistatic properties. In addition, highly active and highly polar polyether which takes ethylene glycol as a reagent and is polymerized and end-capped with ethylene oxide is introduced into the silicate modified aqueous solution, and the highly active and highly polar polyether has the molecular weight in a range of 400 to 600. Due to high polarity and suitable molecular weight, it has better compatibility with water glass, providing the material with better mechanical properties and flexibility, thereby enabling the material to achieve a large expansion rate.

DETAILED DESCRIPTION OF THE PREFERRED EMBODIMENT

The technical solutions in the embodiments of the present invention will be described clearly and completely as below. Obviously, the described embodiments are only a part of the embodiments of the present invention, rather than all the embodiments. Based on the embodiments of the present invention, all other embodiments obtained by those skilled in the art without creative efforts shall fall within the protection scope of the present invention.

First Embodiment

A silicate modified polymer foam material for filling and sealing according to a first preferred embodiment of the present invention contains prepolymerized isocyanate and a silicate modified aqueous solution.
(1) Prepolymerized Isocyanate The prepolymerized isocyanate is prepared by polymerizing 2-carboxyethylphenyl hypophosphorous acid, ethylene glycol, propylene oxide and TDI (toluene diisocyanate), wherein in the prepolymerized isocyanate, a mass percentage of P is 4.4%, a mass percentage of N is 7.9%, a mass percentage of —NCO is 11.9%, a structural formula of the prepolymerized isocyanate is

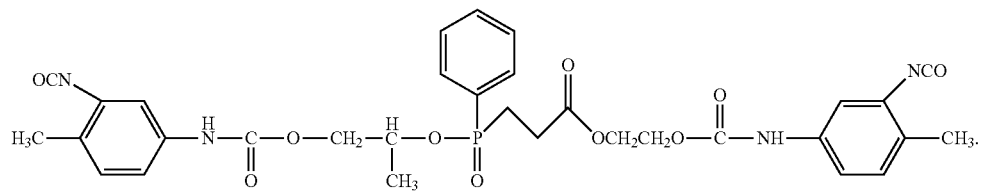

A method of preparing the prepolymerized isocyanate comprises steps of:
(A) preparing 2-carboxyethylphenyl ethylene glycol hypophosphite by performing an esterification reaction on 2-carboxyethylphenyl hypophosphorous acid and ethylene glycol with a molar ratio of 1:1, wherein a reaction equation of the esterification reaction is

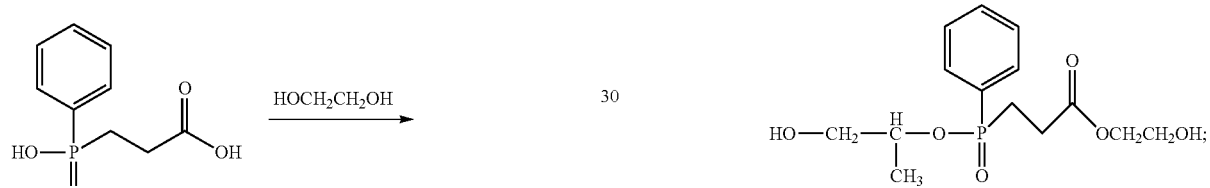

(B) obtaining a phosphorus-containing diol intermediate by performing an addition reaction on the 2-carboxyethylphenyl ethylene glycol hypophosphite and propylene oxide with a molar ratio of 1:1, wherein a reaction equation of the addition reaction is

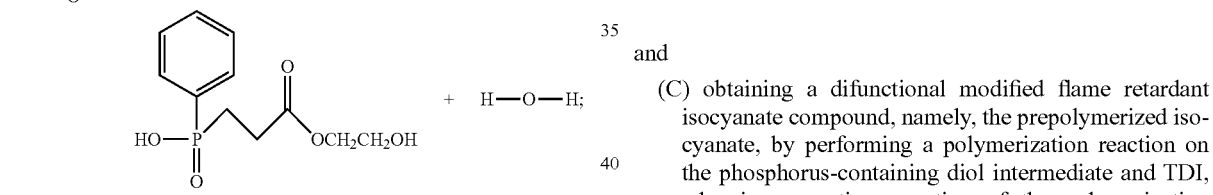

and (C) obtaining a difunctional modified flame retardant isocyanate compound, namely, the prepolymerized isocyanate, by performing a polymerization reaction on the phosphorus-containing diol intermediate and TDI, wherein a reaction equation of the polymerization reaction is

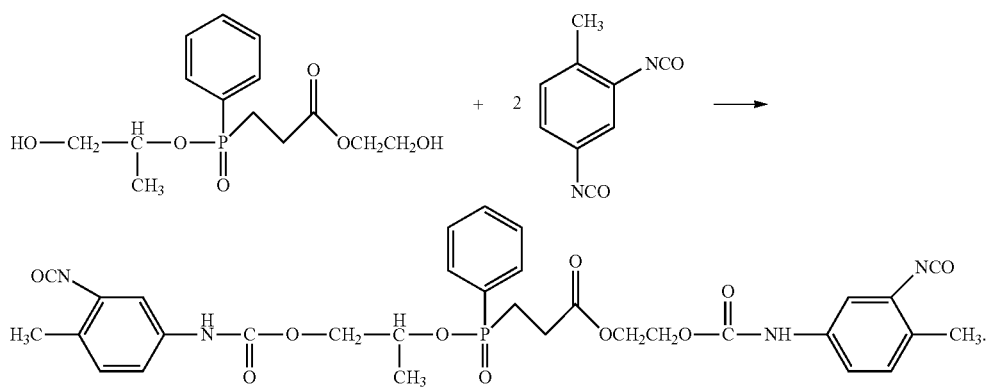

Specifically, a method of preparing a silicate modified polymer foam material for filling and sealing comprises steps of:
(a) putting 2-carboxyethylphenyl hypophosphorous acid which is produced by Wuhan Hezhong Biochemical Manufacturing Co., Ltd., China and ethylene glycol with a molar ratio of 1:1 into a reactor, performing an esterification reaction at 110° C. under catalysis of sulfuric acid or organotin, and obtaining 2-carboxyethylphenyl ethylene glycol hypophosphite after distilling water produced by the esterification reaction from a top of the reactor;

(b) heating the 2-carboxyethylphenyl ethylene glycol hypophosphite to 105° C. in the reactor, slowly adding propylene oxide into the reactor under a premise of using potassium hydroxide as a catalyst, wherein a molar ratio of the 2-carboxyethylphenyl ethylene glycol hypophosphite to the propylene oxide is 1:1, gradually increasing a pressure in the reactor, wherein a maximum pressure in the reactor is 2.5 kgf/cm$^2$, keeping a temperature in the reactor at 110° C., keeping the pressure for 4 h after completing the addition of propylene oxide, keeping the temperature in the reactor at 100° C., and obtaining a phosphorus-containing diol intermediate after removing unreacted small molecules in vacuum;

(c) heating another reactor to 50° C., firstly adding TDI into the another reactor, and then adding the phosphorus-containing diol intermediate into the another reactor at a constant rate, wherein a molar ratio of the phosphorus-containing diol intermediate to the TDI is in a range of 1:(3-4);

(d) heating the reactor to 80° C. and reacting for 2 h;

(e) removing unreacted TDI with a thin film evaporator;

(f) obtaining prepolymerized isocyanate after cooling the reactor to 50° C., wherein in the prepolymerized isocyanate, a mass percentage of P is 4.4%, a mass percentage of N is 7.9% and a mass percentage of —NCO is 11.9%; and (g) mixing the prepolymerized isocyanate with a silicate modified aqueous solution according to a mass ratio in a range of 1:(1.2-1.4), thereby obtaining the silicate modified polymer foam material for filling and sealing.

(2) Performance Indexes of the Silicate Modified Aqueous Solution

In the table, A1 and A33 are catalysts which are produced by Evonik Specialty Chemicals (Shanghai) Co., Ltd., China.

It is able to be seen from the table that from the samples 1 to 4, the small molecule alcohol introduced into the silicate modified aqueous solution is highly active and highly polar polyether which takes ethylene glycol as a reagent and is polymerized and end-capped with ethylene oxide, and is polyethylene glycol 300 with a molecular weight of 300, polyethylene glycol 400 with a molecular weight of 400, polyethylene glycol 600 with a molecular weight of 600, and polyethylene glycol 800 with a molecular weight of 800, respectively. From the data comparison, it is able to be seen that the expansion ratios of samples 1 and 4 are only 15.5 and 16.0 respectively, bubbles are easily collapsed in the sample 1, components are layered and bubbles are easily collapsed in the sample 4. The expansion ratios of samples 2 and 3 are able to reach more than 26, components are not layered and bubbles are not easily collapsed. Therefore, it is able to be concluded that polyethylene glycol with the molecular weight in a range of 400 to 600 has better compatibility than polyethylene glycol with other molecular weights, and is able to provide the higher expansion ratio for materials. In samples 5 and 6, the small molecule alcohol introduced into the silicate modified aqueous solution is polyether which takes ethylene glycol as a reagent and is polymerized and end-capped with propylene oxide, and has a molecular weight of 400 and 600 respectively. From the data comparison, it is able to be seen that the expansion ratios of samples 5 and 6 are only 8.5 and 9.0 respectively, components are layered and bubbles are easily collapsed. Therefore, it is able to be concluded that the highly active and highly polar polyether, which is polymerized and end-capped by ethylene oxide and has the molecular weight in the range of 400 to 600, has better compatibility than the polyether, which is polymerized and end-capped by propylene oxide and has the same molecular weight, and is able to provide the higher expansion ratio for materials.

| No. | Component | Mass Percentage | Sample 1 | Sample 2 | Sample 3 | Sample 4 | Sample 5 | Sample 6 |
|---|---|---|---|---|---|---|---|---|
| 1 | water glass | 65 | Baume degree is 40, modulus is 2.3 | Baume degree is 40, modulus is 2.3 | Baume degree is 40, modulus is 2.3 | Baume degree is 40, modulus is 2.3 | Baume degree is 40, modulus is 2.3 | Baume degree is 40, modulus is 2.3 |
| 2 | small molecule alcohol | 18 | polyethylene glycol 300 | polyethylene glycol 400 | polyethylene glycol 600 | polyethylene glycol 800 | Dihydric alcohol (DL400) | Dihydric alcohol (DL600) |
| 3 | water | 15 | water | water | water | water | water | water |
| 5 | catalyst 1 | 0.5 | A1 | A1 | A1 | A1 | A1 | A1 |
|   | catalyst 2 | 1.5 | A33 | A33 | A33 | A33 | A33 | A33 |
| Performance Test | | | | | | | | |
| No. | Performance Index | | | | | | | |
| 1 | expansion ratio | | 15.5 | 26.5 | 26.7 | 16.0 | 8.5 | 9.0 |
| 2 | remarks | | Components are not layered, and bubbles are easily collapsed | Components are not layered, and bubbles are not easily collapsed | Components are not layered, and bubbles are not easily collapsed | Components are not layered and bubbles are easily collapsed | Components are not layered and bubbles are easily collapsed | Components are not layered and bubbles are easily collapsed |

Test Example 1

(1) The formulation of silicate aqueous solution is as follows.

| | |
|---|---|
| 2451(silicate aqueous solution produced by Qingdao Gulf Group Co., Ltd., China) | 65 |
| polyethylene glycol 400 | 18 |
| water | 15 |
| A1(catalyst produced by Evonik Specialty Chemicals (Shanghai) Co., Ltd., China) | 0.5 |
| A33(catalyst produced by Evonik Specialty Chemicals (Shanghai) Co., Ltd., China) | 1.5 |
| Total | 100 |

(2) Prepolymerized isocyanate is the same as that in first embodiment (3) Using 130 parts of the above-mentioned silicate aqueous solution, and 100 parts of isocyanate in the following table, mixing and stirring to prepare a grouting material.

Isocyanate in each test example 1 (by mass percentage):

| Component | Parameter | Sample 1 | Sample 2 | Sample 3 | Sample 4 | Sample 5 |
|---|---|---|---|---|---|---|
| Isocyanate | Prepolymerized Isocyanate | 100 | 0 | 0 | 0 | 0 |
| | PM200 (Wanhua Chemical Group Co., Ltd., China) | 0 | 100 | 0 | 0 | 74 |
| | 100LL (Wanhua Chemical Group Co., Ltd., China) | 0 | 0 | 100 | 0 | 0 |
| | WANNATE® 8312 | 0 | 0 | 0 | 100 | 0 |
| | Tep | 0 | 0 | 0 | 0 | 26 |

In the above table, WANNATE® 8312 is urethane-modified diphenylmethane diisocyanate with high 2,4-dimer content, and is colorless or light yellow transparent liquid at room temperature.

The isocyanate corresponding to the above-mentioned samples 1, 2, 3, 4, and 5 according to the mass percentages in the above table is equal in weight, and the isocyanate fully reacts with the silicate aqueous solution in a weight ratio of 100:130. The test performance is shown in the table as below.

| Performance classification | Parameter | Sample 1 | Sample 2 | Sample 3 | Sample 4 | Sample 5 |
|---|---|---|---|---|---|---|
| Flame retardant property | Oxygen index | 36.7 | 27.8 | 28.3 | 28.9 | 36.0 |
| Physical properties | Expansion Ratio | 26.7 | 13.2 | 12.3 | 23.5 | 11.5 |
| | Maximum reaction temperature (° C.) | 92 | 120 | 115 | 98 | 105 |
| | Elongation at break (%) | 35% | 10% | 11% | 32% | 7% |
| Environmental properties protection | Fog test | 4.0 | 5.9 | 5.4 | 5.2 | 10.0 |
| | Odor rating (<80° C.) | 3.9 | 7.8 | 5.3 | 4.9 | 9.5 |

Note:
The reference standards for flame retardant and physical properties of each sample are as follows.
Test standards of flame retardant and physical properties: AQ1089-2020
Test standards of odor rating: VDA270:1992
Test standards of fog test: Q/ZK JS 364-201903

The sample 2 uses PM200 of the same quality instead of prepolymerized isocyanate on the basis of sample 1, other conditions remains unchanged, the oxygen index is reduced from 36.7 to 27.8, showing that the flame retardant property is reduced; the expansion ratio is reduced from 26.7 to 13.2, showing that the expansion ratio is dropped significantly; the maximum reaction temperature is increased from 92° C. to 120° C., showing that the maximum reaction temperature is increased significantly; the elongation at break is decreased from 35% to 10%, showing that the toughness is decreased greatly; the fog test is increased from 4.0 to 5.9, and the odor rating is increased from 3.9 to 7.8, showing that the two environmental protection properties are decreased. To sum up, it shows that compared with PM200, prepolymerized isocyanate is able to provide the silicate modified polymer foam material for filling and sealing with better flame retardant and environmental protection properties, lower maximum reaction temperature, better toughness and higher expansion ratio.

The sample 3 uses 100 LL of the same quality instead of prepolymerized isocyanate on the basis of sample 1, other conditions remains unchanged, the oxygen index is reduced from 36.7 to 28.3, showing that the flame retardant property is reduced; the expansion ratio is reduced from 26.7 to 13.2, showing that the expansion ratio is dropped significantly; the maximum reaction temperature is increased from 92° C. to 115° C., showing that the maximum reaction temperature is increased significantly; the elongation at break is decreased from 35% to 11%, showing that the toughness is decreased greatly; the fog test is increased from 4.0 to 5.4, and the odor rating is increased from 3.9 to 5.3, showing that the two environmental protection properties are decreased. To sum up, it shows that compared with 100 LL, prepolymerized isocyanate is able to provide the silicate modified polymer foam material for filling and sealing with better flame retardant and environmental protection properties, lower maximum reaction temperature, better toughness and higher expansion ratio.

The sample 4 uses WANNATE® 8312 of the same quality instead of prepolymerized isocyanate on the basis of sample 1, other conditions remains unchanged, the oxygen index is reduced from 36.7 to 28.9, showing that the flame retardant property is reduced; the expansion ratio is reduced from 26.7 to 23.5, showing that the expansion ratio is dropped slightly; the maximum reaction temperature is increased from 92° C. to 98° C., showing that the maximum reaction temperature is increased slightly; the elongation at break is decreased from 35% to 32%, showing that the toughness is decreased slightly; the fog test is increased from 4.0 to 4.2, and the odor rating is increased from 3.9 to 4.9, showing that the two environmental protection properties are decreased slightly. To sum up, it shows that compared with WANNATE® 8312, prepolymerized isocyanate is slight better in environmental protection properties, maximum reaction temperature, toughness and expansion ratio, and is able to provide the silicate modified polymer foam material for filling and sealing with better flame retardant property.

In brief, it shows that compared with achieving the same flame retardant level by PM200 and additive flame retardants, prepolymerized isocyanate is able to provide the silicate modified polymer foam material for filling and sealing with higher expansion ratio and toughness, lower maximum reaction temperature, better toughness and environmental protection properties.

Test Example 2

The phenolic material commonly used in coal mines are selected for testing. The specific indicators are shown in the table as below.

| | Performance indexes | | |
|---|---|---|---|
| No. | Performance index | Phenolic material | Sample 1 in test example 1 |
| 1 | Oxygen index (%) | 35.5 | 36.7 |
| 2 | Expansion ratio | 27 | 26.7 |
| 3 | Compressive strength (10% deformation variable, KPa) | 19 | 36 |
| 4 | Maximum reaction temperature (° C.) | 94 | 92 |
| 5 | Odor rating (<80° C.) | 11.3 | 3.9 |
| 6 | Fog test | 8.0 | 4.0 |
| 7 | Halogen content | 2% | 0 |
| 8 | Free formaldehyde (g/kg) | 1.2 | 0 |
| 9 | Elongation at break (%) | 15% | 35% |
| 10 | Surface resistance (Ω) | $3.8 \times 10^5$ | $2 \times 10^5$ |
| 11 | Combustion elongation | yes | no |
| 12 | Smoke toxicity index | 9 | 3.2 |

According to the data analysis of the above table, between the phenolic material and the silicate modified polymer foam material for filling and sealing provided by the present invention, there is little difference in oxygen index, expansion ratio, compressive strength (10% deformation variable), and maximum reaction temperature. The oxygen index, expansion ratio, compressive strength (10% deformation variable), and maximum reaction temperature of the phenolic material are able to meet the requirements of AQ/T1090-2020; and however, the performance indexes, that the surface resistance is $3.8 \times 10^5 \Omega$, the combustion elongation is yes and the smoke toxicity index is 9, are unable to meet the requirements of AQ/T1090-2020. The sample 1 of the silicate modified polymer foam material for filling and sealing provided by the present invention has the surface resistance of $2 \times 10^5 \Omega$, no combustion elongation, and the smoke toxicity index of 3.2, all of which are better and are able to meet the requirements of AQ/T1090-2020 that the surface resistance $\leq 1 \times 10^8 \Omega$, no combustion elongation, and the smoke toxicity index $\leq 5$. The phenolic material has the odor rating (<80° C.) of 11.3, the fog test of 8.0, the free formaldehyde of 1.2 g/kg and the halogen content of 2%. The sample 1 has the odor rating (<80° C.) of 3.9, the fog test of 4.0, no free formaldehyde and no halogen. Obviously, the silicate modified polymer foam material for filling and sealing provided by the present invention has better environmental protection indexes. The phenolic material has the elongation at break of 15%, but the sample 1 has the elongation at break of 35%, showing the better roughness. To sump up, compared with the phenolic material, the silicate modified polymer foam material for filling and sealing provided by the present invention has better environmental protection properties and roughness, no combustion elongation and lower surface resistance.

Finally, it should be noted that the above are only preferred embodiments of the present invention and are not intended to limit the present invention. Although the present invention has been described in detail with reference to the foregoing embodiments, those skilled in the art are able to still make modifications to the technical solutions described in the foregoing embodiments, or perform equivalent replacements to some of foregoing embodiments. Although the specific embodiments of the present invention are described above, they are not intended to limit the protection scope of the present invention. Those skilled in the art should understand that on the basis of the technical solutions of the present invention, various modifications or deformations are still within the protection scope of the present invention.

What is claimed is:

1. A method of preparing a silicate modified polymer foam material for filling and sealing, wherein the silicate modified polymer foam material is obtained by mixing prepolymerized isocyanate and a silicate modified aqueous solution;

the prepolymerized isocyanate is prepared by a method comprising steps of:

(A) preparing 2-carboxyethylphenyl ethylene glycol hypophosphite by performing an esterification reaction on 2-carboxyethylphenyl hypophosphorous acid and ethylene glycol with a molar ratio of 1:1, wherein a reaction equation of the esterification reaction is

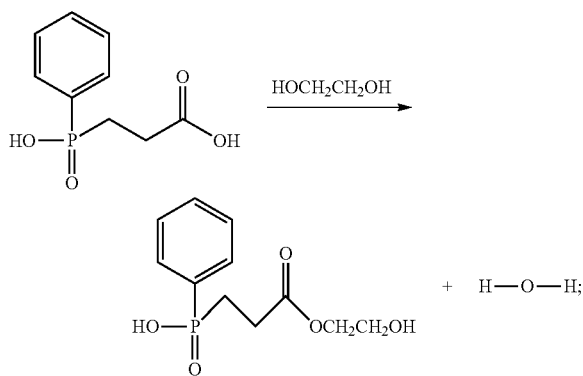

(B) obtaining a phosphorus-containing diol intermediate by performing an addition reaction on the 2-carboxyethylphenyl ethylene glycol hypophosphite and propylene oxide with a molar ratio of 1:1, wherein a reaction equation of the addition reaction is

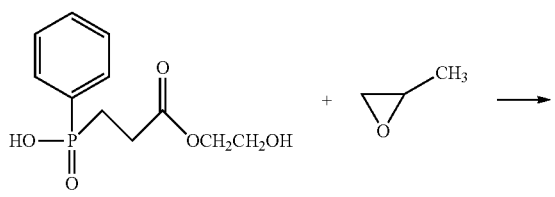

-continued

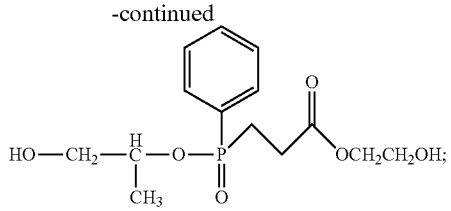

and (C) performing a polymerization reaction on the phosphorus-containing diol intermediate and toluene diisocyanate (TDI) to obtain a difunctional modified flame retardant isocyanate compound which is the prepolymerized isocyanate, wherein a reaction equation of the polymerization reaction is

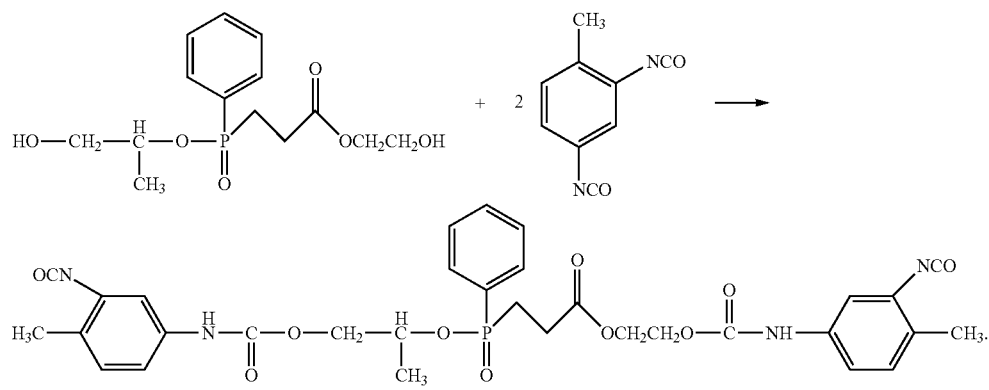

2. A method of preparing a silicate modified polymer foam material for filling and sealing, the method comprising steps of:
(a) preparing 2-carboxyethylphenyl ethylene glycol hypophosphite, which comprises putting 2-carboxyethylphenyl hypophosphorous acid and ethylene glycol with a molar ratio of 1:1 into a reactor, performing an esterification reaction at 105-110° C. under catalysis of sulfuric acid or organotin, and distilling water produced by the esterification reaction from a top of the reactor, so that the 2-carboxyethylphenyl ethylene glycol hypophosphite is obtained;
(b) obtaining a phosphorus-containing diol intermediate, which comprises heating the 2-carboxyethylphenyl ethylene glycol hypophosphite to 100-110° C. in the reactor, slowly adding propylene oxide into the reactor under a premise of using potassium hydroxide as a catalyst, wherein a molar ratio of the 2-carboxyethylphenyl ethylene glycol hypophosphite to the propylene oxide is 1:1, gradually increasing a pressure in the reactor, wherein a maximum pressure in the reactor is 2.5 kgf/cm², keeping a temperature in the reactor at 100-115° C., keeping the pressure for 4 h after completing the addition of propylene oxide, keeping the temperature in the reactor at 100° C., and removing unreacted small molecules in vacuum, so that the phosphorus-containing diol intermediate is obtained;
(c) heating another reactor to 48-52° C., firstly adding toluene diisocyanate (TDI) into the another reactor, and then adding the phosphorus-containing diol intermediate into the another reactor at a constant rate, wherein a molar ratio of the phosphorus-containing diol intermediate to the TDI is in a range of 1:(3-4);
(d) heating the another reactor to 78-82° C. and reacting for 1.9-2.2 h;
(e) removing unreacted TDI with a thin film evaporator;
(f) obtaining prepolymerized isocyanate after cooling the another reactor to 48-52° C., wherein in the prepolymerized isocyanate, a mass percentage of P is 4.4%, a mass percentage of N is 7.9% and a mass percentage of —NCO is 11.9%; and
(g) mixing the prepolymerized isocyanate with a silicate modified aqueous solution according to a mass ratio in a range of 1:(1.2-1.4), thereby obtaining the silicate modified polymer foam material for filling and sealing.

* * * * *